March 10, 1936.  D. MILLER  2,033,778
VENTILATOR MECHANISM FOR VEHICLE WINDOWS
Filed Aug. 17, 1933   2 Sheets-Sheet 1
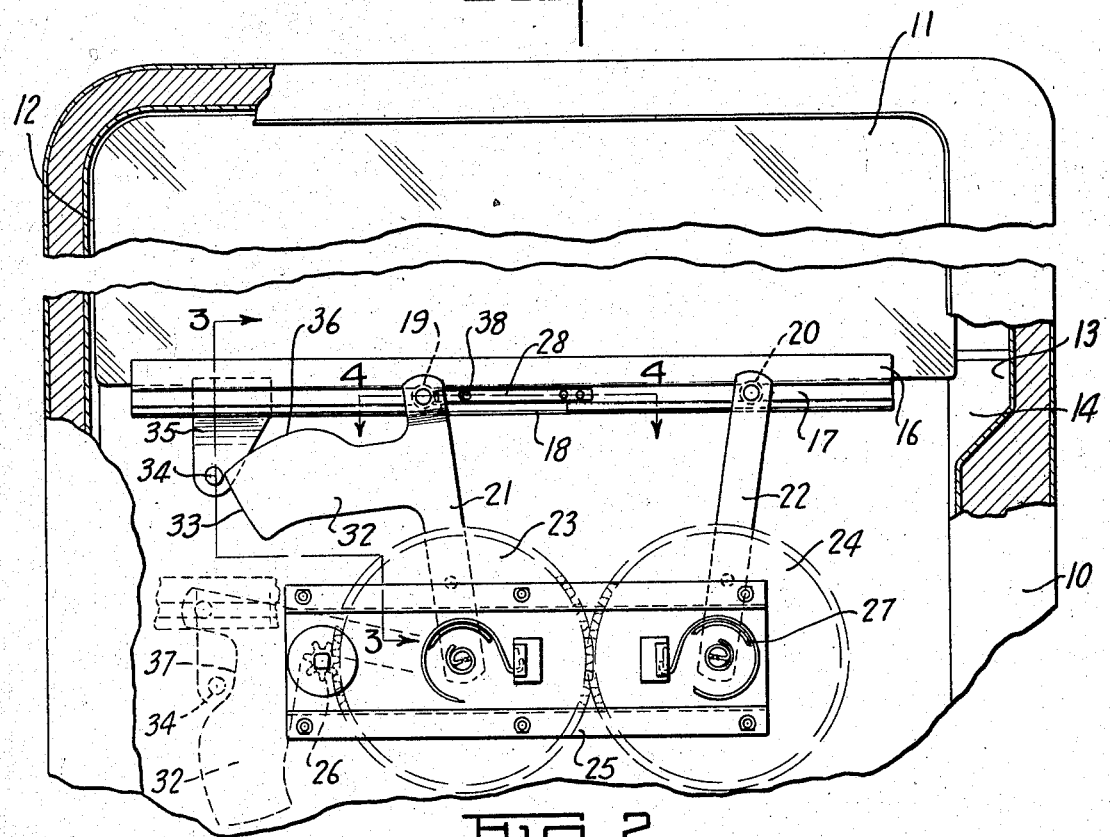
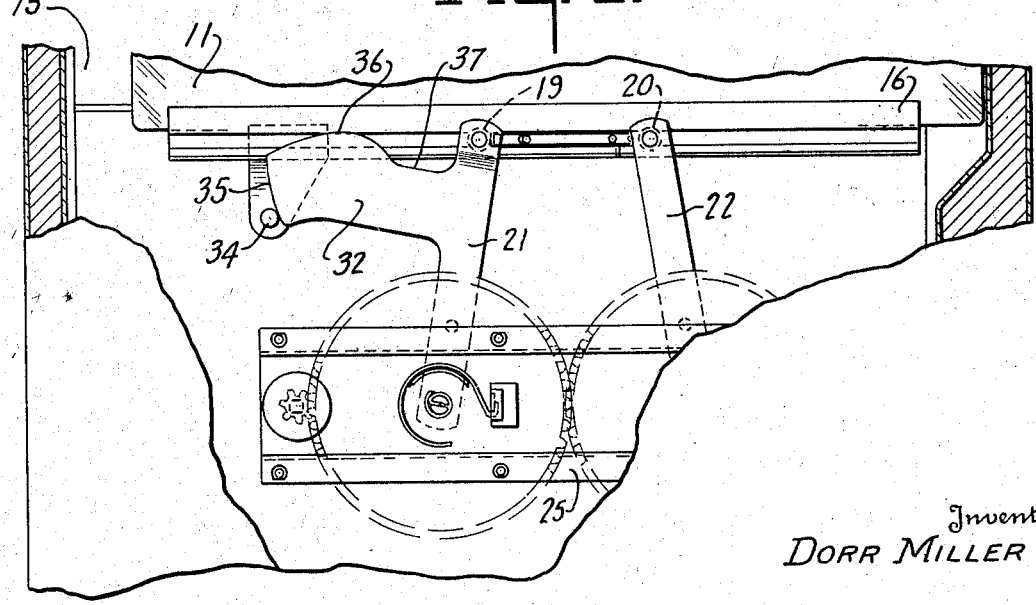
Inventor
DORR MILLER March 10, 1936.   D. MILLER   2,033,778
VENTILATOR MECHANISM FOR VEHICLE WINDOWS
Filed Aug. 17, 1933   2 Sheets-Sheet 2

Inventor
DORR MILLER

Patented Mar. 10, 1936

2,033,778

UNITED STATES PATENT OFFICE 2,033,778

VENTILATOR MECHANISM FOR VEHICLE WINDOWS

Dorr Miller, Detroit, Mich., assignor, by mesne assignments, to Automobile Ventilation, Inc., Detroit, Mich., a corporation of Michigan Application August 17, 1933, Serial No. 685,596

6 Claims. (Cl. 268—126)

This invention relates to so-called "draftless ventilation", for vehicles, and an object is to provide simple and efficient ventilator mechanism for vehicle windows whereby in an exceedingly simple and inexpensive manner the window may be raised and lowered and when in raised position it can be moved laterally edgewise to provide a ventilating opening. An important object is to simplify and improve mechanisms of this character, rendering them less expensive, and materially reducing the number of operating parts. Further objects and advantages will appear hereinafter, and an embodiment of the invention is shown for illustrative purposes only on the accompanying drawings, in which:

Figure 1 is a vertical sectional elevation of a portion of a vehicle door showing the window and regulator mechanism therefor, the window being shown in raised or closed position, there being shown in dotted lines the position one of the regulator arms assumes during the downward movement of the window;

Figure 2 is a fragmentary sectional elevation showing the position the parts assume when the window is moved transversely or edgewise to provide the ventilating opening;

Figure 3:
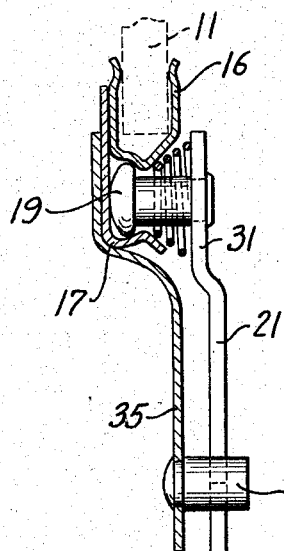
Figure 3 is an enlarged side edge view of one of the regulator arms and associated parts.
Figure 4:
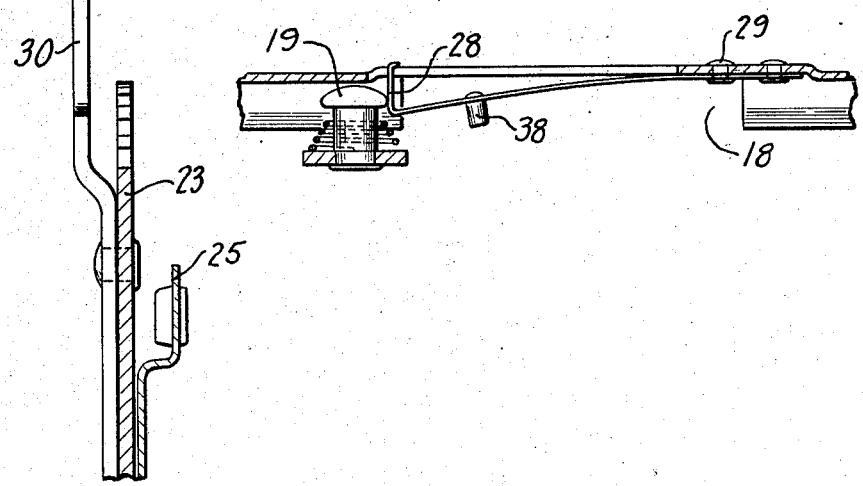
Figure 4 is an enlarged sectional view of the stop disposed in the window channel, which is engaged for moving the window transversely in one direction.

The illustrated embodiment of the invention comprises a door 10 having the usual window opening and window 11, which is mounted for vertical movements to and from raised or closed position. On the front edge of the door is the usual U-shaped felt run-way 12 in which the window 11 moves vertically. In the opposite or rear edge of the door adjacent the upper portion thereof is a relatively deep well or recess 13, the run-way 14 therefor being accordingly enlarged. As will hereinafter appear, mechanism is provided which is effective not only to raise and lower the window 11, but when the window is in its raised or closed position, transverse movements in the plane of the window may be imparted thereto for moving the window laterally into the well 13 to provide a ventilating opening 15 between the front vertical edge of the window and the adjacent run-way. Through the ventilating opening 15 smoke, foul gases, etc. may be withdrawn from the inside of the vehicle owing to the suction created during the forward travel of the vehicle.

For operating the window to effect the movements above described, a channel 16 is fixed to the lower edge of the window in a suitable manner, and depending therefrom is a strip having a horizontally elongate guideway or channel 17, the central portion of which is cut out, as indicated at 18, for a purpose hereinafter described. Disposed within the guideway or channel 17 are rollers 19 and 20 mounted respectively on arms 21 and 22.

The opposite ends of the arms 21 and 22 are secured respectively to gears 23 and 24, which mesh with each other and are carried by a mounting plate 25 suitably secured to the door 10. For operating the gears 23 and 24 is a pinion 26 meshing with the gear 23 and adapted to be operated by a handle disposed on the outside of the door. Spiral springs 27 are associated with each of the gears 23 and 24, but since springs of this character and the mounting of the gears are features well known to those skilled in this art, detailed description thereof is not deemed necessary.

It will be apparent from the above description that actuation of the pinion 26 in one direction or the other operates through the arms 21 and 22 to raise and lower the window 11 according to the direction of rotation of the gears, the rollers on the ends of the regulator arms traveling in the guide channel 17. During the window raising operation, the arms 21 and 22 move toward each other, and during the lowering movement of the window the arms move away from each other, as will be readily understood.

In order to effect the transverse movement of the window 11 when in raised position to provide the ventilating opening 15, a stop 28 in the form of a substantially L-shaped spring secured to the channel 17 by rivets 29 is disposed in the path of movement of the roller 19. After the window is raised substantially to closed position the roller 19 abuts against the stop 28, and upon further movement of the arm 21 to the right of Figure 1, the window 11 is bodily moved transversely in the plane thereof, thereby moving the rear edge of the window into the recess 13. Thus, it is apparent that the same roller 19 which is effective to raise and lower the window 11, also functions to impart edgewise movement to the window to move the forward vertical edge of the window away from the adjacent run-way 12.

As shown in Figure 3, a portion 30 of the arm 21 is spaced inwardly from the plane of the gear 23, and the upper end portion 31 thereof, which carries the roller 19, is spaced inwardly from the portion 30. Forming a part of the arm 21 and extending forwardly therefrom is a plate 32 having an arcuately shaped cam abutment surface 33 at the forward edge thereof. The abutment surface 33 is engageable with a pin or roller 34 projecting outwardly from a bracket plate 35 fixed as by welding to the rear face of the channel 17.

It will be apparent that the bracket 35 moves with the window 11, and the parts are so arranged that when the window 11 has been moved transversely to provide the ventilating opening 15, the pin 35 is disposed substantially in contact with the lower edge portion of the abutment surface 35, as shown in Figure 2. Upon reverse movement of the pinion 26 in a direction to lower the window 11, the cam abutment surface 35 bears against the pin 34, and, during the swinging movement of the arm 21 in a counter clockwise direction, cams the window 11 to the left or forwardly to close the ventilating opening, the curvature of the surface 35 being properly designed with respect to the swinging movement of the arm. It will be observed that the upper surface 36 of the plate 32 curves upwardly and then downwardly to provide a recessed portion 37. The edge portion 36 is so designed that after the window 11 has been returned to closed position the parts are so arranged that the window may be moved downwardly without being obstructed by the pin 34, the surface 36 being properly shaped for this purpose.

As shown by the dotted lines in Figure 1, the pin 34 enters the recessed portion 37 of the plate 32 during the downward swinging movement of the arm 21, and by entering the recess the arm 21 is allowed to swing without interference in a counter clockwise direction to effect the desired lowering of the window 11. It will be understood that during the downward swinging movement of the arm 21 the arm 22 swings in the opposite or clockwise direction, and assists in this operation as well as in supporting the window. The operation of the parts above described for raising the window will be readily understood without further description.

It is desirable to hold the window 11 in closed position against a force exerted directly thereagainst tending to move the same edgewise or transversely of the plane of the window, as for example, by a tool inserted between an edge of the window and the run-way 12 to force the window laterally, but this movement is blocked by the cam abutment surface 33 against which the pin 34 abuts, thus effectively resisting such edgewise movement. It is to be noted that lateral movement of the window is also blocked during a considerable portion of the downward movement of the window, because not only does the pin 34 abut against the cam surface 33, but later on also against the surface 36 which is also effective in resisting such movement. In this manner unwarranted access to the interior of the car is prevented.

When it is desired to remove the window 11, as in case of breakage, and in order to facilitate assembling the regulator and window parts, the spring stop plate 26 is provided with a button 38, which may be engaged for pressing the plate 28 inwardly to allow the roller 19 to move thereover so that it can be moved from the channel 17 through the cutout portion 18. It will be understood that the roller 20 can also move along the channel 17 to the cutout portion 18, both rollers entering the cutout portion at substantially the same time. This enables the window 11 to be readily assembled or disassembled with respect to the regulator mechanism.

Numerous changes in construction, arrangement and operation may be effected without departing from the spirit of the invention, especially as defined in the appended claims.

What I claim is new and desire to secure by Letters Patent is:

1. A regulator for a window mounted for vertical sliding movement and for horizontal movement in its plane when the window is in predetermined elevated position, including a retainer member adapted to be secured to the lower edge of a window and having a longitudinal horizontal guideway therein, a depending extension carried by said member, regulator means for raising and lowering the window and including a swinging regulator arm having a projecting device slidingly received in said guideway, said retainer member having a movable stop carried thereby and projecting into the path of said device and adapted to be engaged thereby for shifting the window horizontally, and means carried by said arm separate from said device and adapted to engage said extension for shifting the window horizontally in the opposite direction.

2. A regulator for a window mounted for vertical sliding movement and for horizontal movement in its plane when the window is in predetermined elevated position, a retainer member adapted to be secured to the lower edge of a window and having a longitudinal horizontal guideway, a depending extension carried by said member, regulator mechanism for raising and lowering the window and including a swinging regulator arm having a projecting device slidingly received in said guideway, said retainer member having a yieldable stop carried thereby and projecting into the path of said device and adapted to be engaged thereby for shifting the window horizontally, means carried by said arm separate from said device and adapted to engage said extension for shifting the window horizontally in the opposite direction, and cooperating cam means carried by said arm and extension for locking the window against horizontal movement at a predetermined elevated position of the window.

3. In a regulator mechanism for a window mounted for vertical and horizontal sliding movement, a retainer member secured to the lower edge of the window and having a longitudinal runway, a regulator for raising and lowering the window and including a swinging arm having a device slidable in said runway, a stop in said runway engageable by said device for shifting the window horizontally in one direction, said stop being adapted to be shifted in said runway to permit the passage thereby of said device, and an extension carried by said arm and having means cooperating with said retainer member for shifting the window horizontally in the opposite direction.

4. In a regulator mechanism for a window mounted for vertical and horizontal sliding movement, a retainer member secured to the lower edge of the window and having a longitudinal runway, a regulator for raising and lowering the window and including a swinging arm having a device slidable in said runway, a removable stop in said runway engageable by said device for shifting the window horizontally in one direction, and an extension carried by said arm and having means cooperating with said retainer member for shifting the window horizontally in the opposite direction, said extension also having means for locking said window against horizontal movement when in predetermined elevated position.

5. In a regulator mechanism for a window mounted for vertical and horizontal sliding movement, a retainer member secured to the lower edge of the window and having a longitudinal runway, a regulator for raising and lowering the window and including a swinging arm having a device slidable in said runway, a stop in said runway engageable by said device for shifting the window horizontally in one direction, said stop being shiftable to permit the passage thereby of said device at predetermined times, a depending extension on said retainer member and an angular extension on said arm, said extensions having separate cooperating means for successively shifting the window horizontally in the opposite direction and for locking the window against horizontal movement when in predetermined elevated position.

6. In a regulator mechanism for a window mounted for vertical sliding movement and also for horizontal movement in its plane when the window is in predetermined elevated position, comprising a retainer member adapted to be secured to the lower edge of the window and having a longitudinal guideway, regulator mechanism for raising and lowering the window and including a swinging arm having a device interlocked in said guideway and slidable therein, a laterally yieldable stop carried by said retainer member and enageable by said device for shifting the window in its plane horizontally in one direction, and separate means carried by said arm and cooperating with said retainer member for shifting the window horizontally in the opposite direction.

DORR MILLER.